US 12,187,498 B2

(12) United States Patent
Choi

(10) Patent No.: US 12,187,498 B2
(45) Date of Patent: Jan. 7, 2025

(54) AIRTIGHT CONTAINER WITH SOFT HINGE AND DOUBLE INJECTION-MOLDING STRUCTURE

(71) Applicant: NEOFLAM Inc., Wonju-si (KR)

(72) Inventor: Woon Hwan Choi, Siheung-si (KR)

(73) Assignee: NEOFLAM Inc., Wonju-si (KR)

(*) Notice: Subject to any disclaimer, the term of this patent is extended or adjusted under 35 U.S.C. 154(b) by 0 days.

(21) Appl. No.: 17/617,208

(22) PCT Filed: Feb. 10, 2021

(86) PCT No.: PCT/KR2021/001787
§ 371 (c)(1),
(2) Date: Dec. 7, 2021

(87) PCT Pub. No.: WO2021/162453
PCT Pub. Date: Aug. 19, 2021

(65) Prior Publication Data
US 2022/0402662 A1    Dec. 22, 2022

(30) Foreign Application Priority Data
Feb. 14, 2020    (KR) .................. 10-2020-0018204

(51) Int. Cl.
*B65D 45/22*    (2006.01)
*B65D 1/26*    (2006.01)
*B65D 53/02*    (2006.01)

(52) U.S. Cl.
CPC .............. *B65D 45/22* (2013.01); *B65D 1/26* (2013.01); *B65D 53/02* (2013.01)

(58) Field of Classification Search
CPC ...... B65D 45/16; B65D 45/322; B65D 45/22; B65D 43/265; B65D 43/267
(Continued)

(56) References Cited

U.S. PATENT DOCUMENTS

| | | | |
|---|---|---|---|
| 2007/0267426 A1* | 11/2007 | Arciniegas M. ... | B65D 71/0096 220/756 |
| 2015/0136786 A1* | 5/2015 | Lonner ................ | B65D 21/086 220/529 |
| 2015/0183563 A1* | 7/2015 | Luizzi ................ | B65D 33/2508 53/449 |

FOREIGN PATENT DOCUMENTS

JP    3155696    11/2009
KR    20-0365936    10/2004
(Continued)

OTHER PUBLICATIONS

International Search Report, with English translation, for International Application No. PCT/KR2021/001787, dated Jun. 7, 2021.
(Continued)

*Primary Examiner* — Anthony D Stashick
*Assistant Examiner* — Raven Collins
(74) *Attorney, Agent, or Firm* — Kile Park Reed & Houtteman PLLC

(57) ABSTRACT

Disclosed is an airtight container including a main body with an opening, and a cover, the airtight container including: an edge portion to press a sealing edge formed at an upper end of the main body; a locking clamp including an engaging portion to engage with an engaging-portion holder extended from the sealing edge or formed in a lateral wall; and a hinge provided between the edge portion and the locking clamp and including a material to be folded and unfolded with respect to the edge portion so that the engaging portion can be locked to and released from the engaging-portion holder. Thus, there is provided an airtight container with a soft hinge and a double injection-moulding structure, which is improved in durability because the hinge is prevented from damage even though it is used for a long time.

8 Claims, 8 Drawing Sheets

(58) Field of Classification Search
USPC .......................................................... 220/326
See application file for complete search history.

(56) References Cited

FOREIGN PATENT DOCUMENTS

| KR | 20-2008-0002204 | 6/2008 |
| KR | 20-2010-0009527 | 9/2010 |
| KR | 10-1004351 | 12/2010 |
| KR | 10-2011-0015122 | 2/2011 |
| WO | 2004-103845 | 12/2004 |

OTHER PUBLICATIONS

Written Opinion, with English translation, for International Application No. PCT/KR2021/001787, dated Jun. 7, 2021.

* cited by examiner

AIRTIGHT CONTAINER WITH SOFT HINGE AND DOUBLE INJECTION-MOLDING STRUCTURE

CROSS-REFERENCE TO RELATED THE APPLICATION

This application is a national entry of International Application No. PCT/KR2021/001787, filed on Feb. 10, 2021, which claims under 35 U.S.C. § 119(a) and 365(b) priority to and benefits of Korean Patent Application No. 10-2020-0018204 filed on Feb. 14, 2020 in the Korean Intellectual Property Office, the disclosure of which is incorporated by reference herein in its entirety.

BACKGROUND

Field

The disclosure relates to an airtight container with a soft hinge and a double injection-moulding structure, and more particularly to an airtight container with a soft hinge and a double injection-moulding structure, which is improved in durability because the hinge smoothly operates and is prevented from damage while accommodating and sealing content in the airtight container, is enhanced in sanitariness because it is easily cleaned and washed, and maintains a beautiful outer appearance.

Description of the Related Art

In general, food is put in an airtight container and taken out as much as an appropriate amount when necessary so that the food can be maintained for a long time and stored hygienically.

Such an airtight container has a structure to prevent air from flowing in or flowing out of the airtight container. To this end, a packing made of an elastic material is typically provided in a coupling portion between a container main body and a cover, and the container main body and the cover are coupled by a locking clamp formed in the circumference of the cover, thereby maintaining the airtightness.

However, the cover and the locking clamp are generally injection-molded as a single body with a hinge formed therebetween. Such a hinge is likely to reach its fatigue limit and become weak against impact as the hinge is repeatedly folded and unfolded. Further, it would be desired if the airtight container is easily washed and cleaned.

To solve these problems, various attempts such as the related arts have been made.

Although the related arts have tried to overcome the hinge of synthetic resin even a little bit, there is a limit to overcoming the fatigue limit of the hinge.

Accordingly, it would be desired if the locking clamp is double injection-molded while using a soft material for both the hinge and the locking clamp.

Documents of Related Art

Korean Patent No. 10-1004351 (published on Dec. 28, 2010)
Korean Utility-model Publication No. 20-2010-0009527 (published on Sep. 29, 2010).

SUMMARY

An aspect of the disclosure is to provide an airtight container with a soft hinge and a double injection-moulding structure, in which the hinge is prevented from damage even though it is used for a long time, thereby improving durability.

Another aspect of the disclosure is to provide an airtight container with a soft hinge and a double injection-moulding structure, which has a simple structure based on a double injection-molding structure, is readily cleaned with ease of use, is smoothly locked and unlocked, and is improved in sanitariness.

Still another aspect of the disclosure is to provide an airtight container with a soft hinge and a double injection-moulding structure, which has a beautiful outer appearance with various colors based on a double injection-molding structure.

According to an embodiment, there is provided an airtight container including a container main body with an opening opened upward, and a cover for covering and opening the opening, the airtight container including: an edge portion coupled to an edge of the cover to become in close contact with a sealing edge formed at an upper end of the container main body; a locking clamp extended from the edge portion and including an engaging portion to engage with an engaging-portion holder extended from the sealing edge or formed in a lateral wall so that the container main body and the cover can be airtightly coupled; and a hinge provided between the edge portion and the locking clamp and including a material to be folded and unfolded with respect to the edge portion so that the engaging portion can be locked to and released from the engaging-portion holder.

Further, the material of the hinge may include silicon rubber.

Further, the materials of the edge portion and the locking clamp may include silicon rubber.

Further, the engaging portion may include a hard synthetic resin and couple with the locking clamp.

Further, the engaging portion may couple with the locking clamp by double injection-molding or thermal fusion.

Further, the hinge may be thinner than the locking clamp.

Further, the hinge may have the same thickness as the locking clamp and protrude upward.

Further, the edge portion, the hinge and the locking clamp, which are coupled to the cover, may become parallel to a plate of the cover when released from the container main body.

BRIEF DESCRIPTION OF THE DRAWINGS

The above and/or the aspects will become apparent and more readily appreciated from the following description of exemplary embodiments, taken in conjunction with the accompanying drawings, in which.

DETAILED DESCRIPTION OF EXEMPLARY EMBODIMENTS

An airtight container with a soft hinge and a double injection-moulding structure according to an embodiment of the disclosure (hereinafter, referred to as an 'airtight container 100') will be described in detail with reference to FIGS. 1 to 5B.

Figure 1:
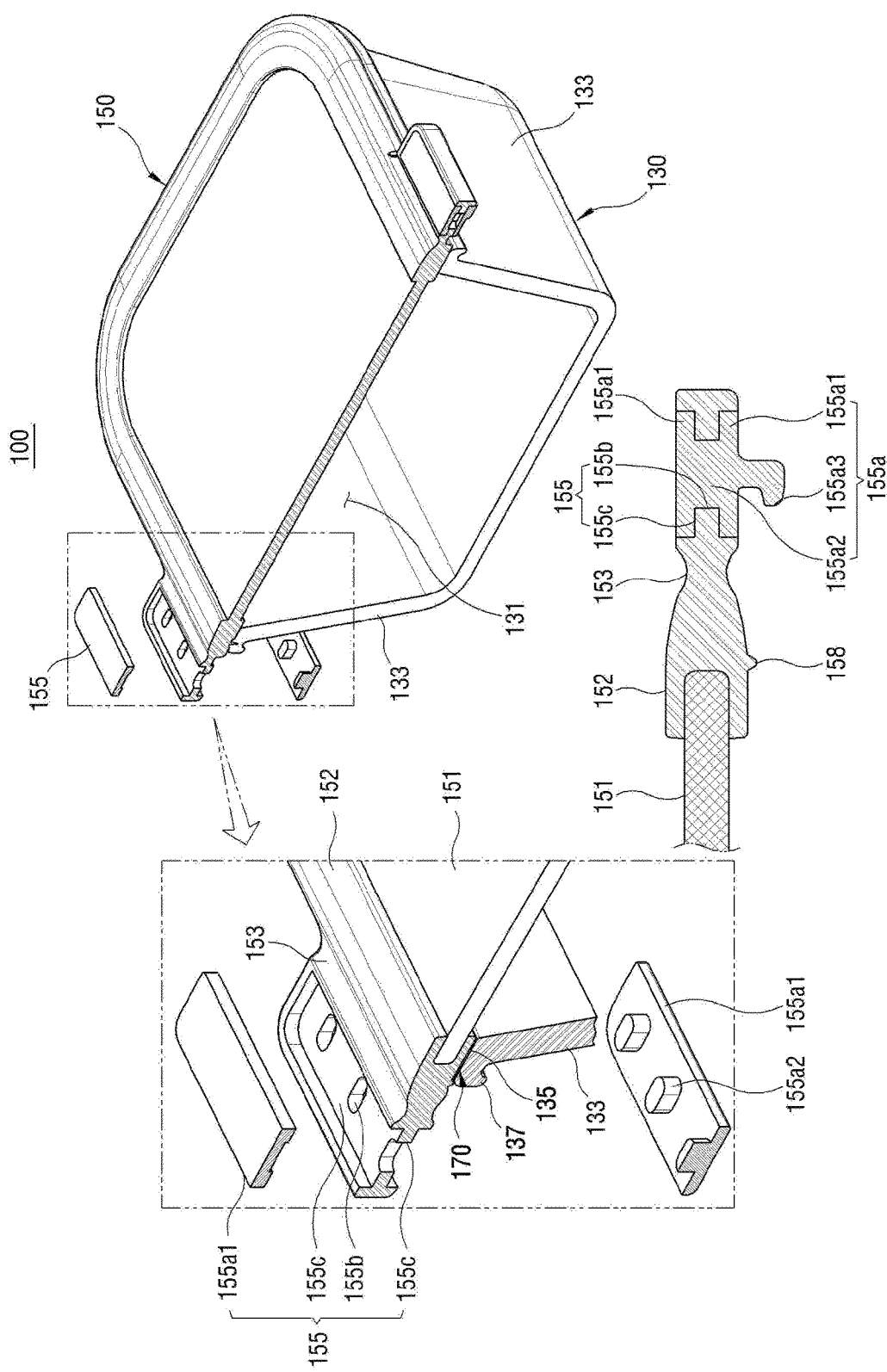
FIG. 1 is a perspective view and a partial enlarged view of an airtight container according to an embodiment of the disclosure.
Figure 2:
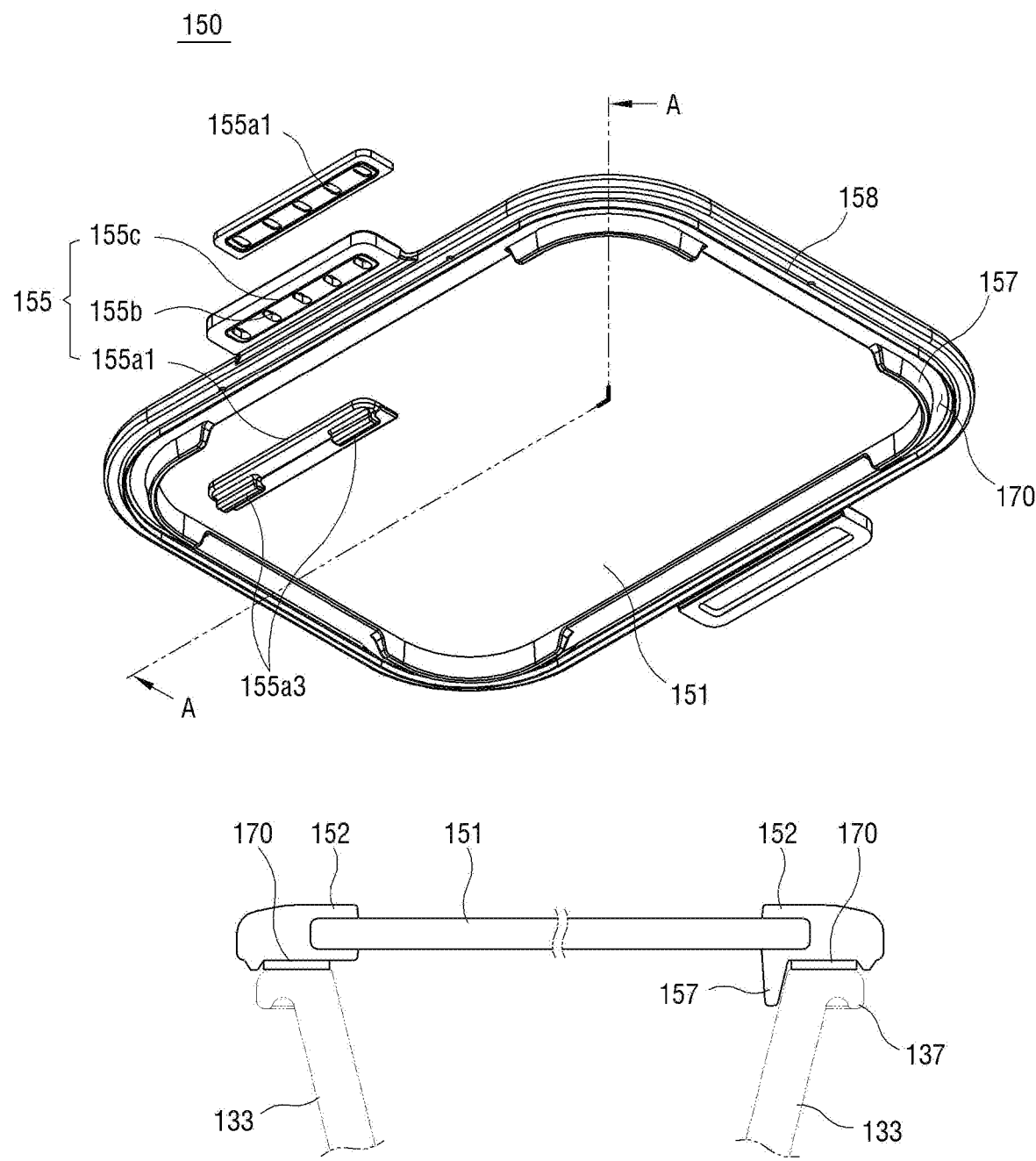
FIG. 2 is a perspective view and a cross-sectional view of a cover in FIG. 1 viewed from below.
Figure 3A:
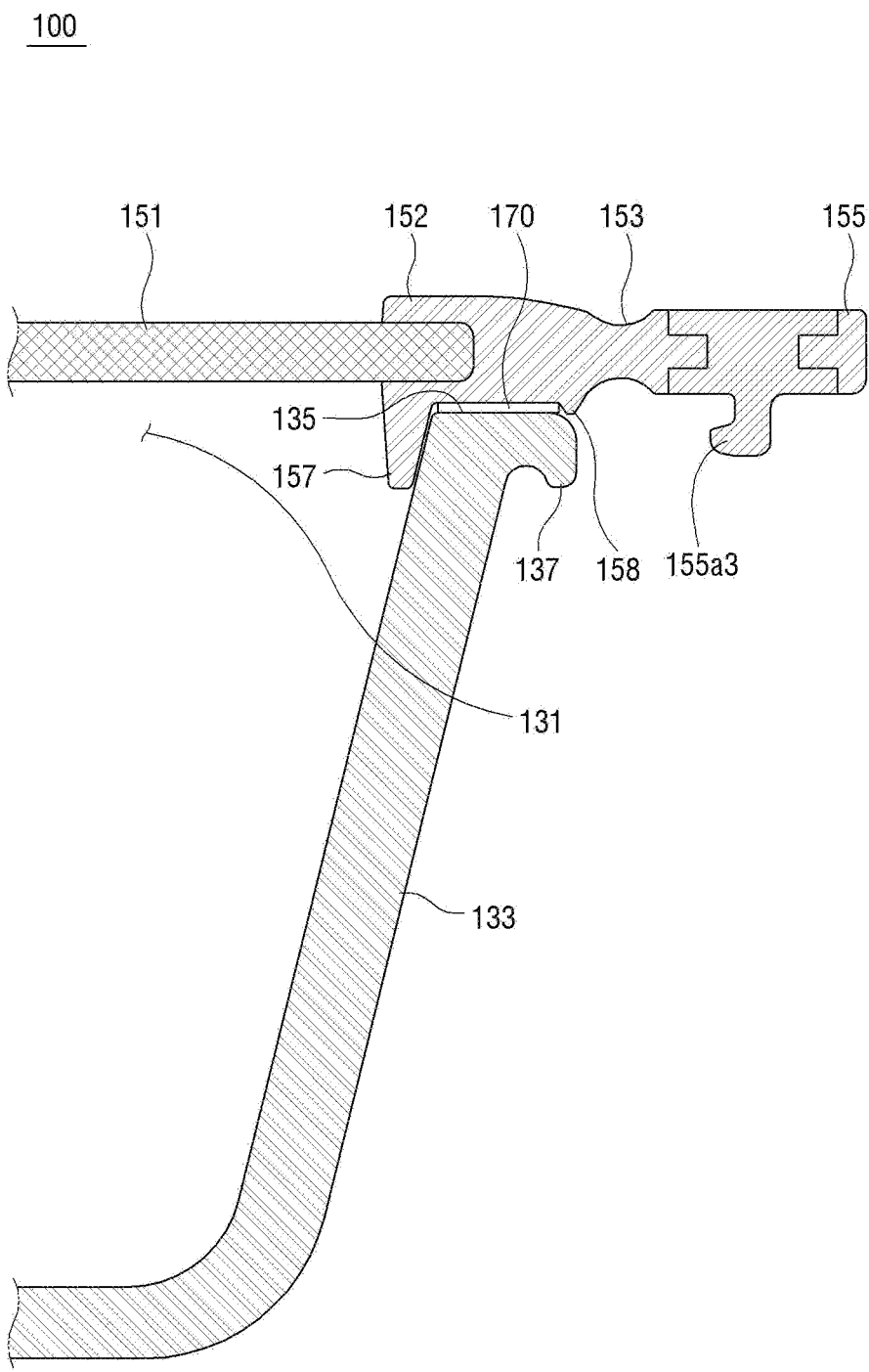
FIGS. 3A to 3C are partial cross-sectional views for describing operations of the airtight container.
Figure 3B:
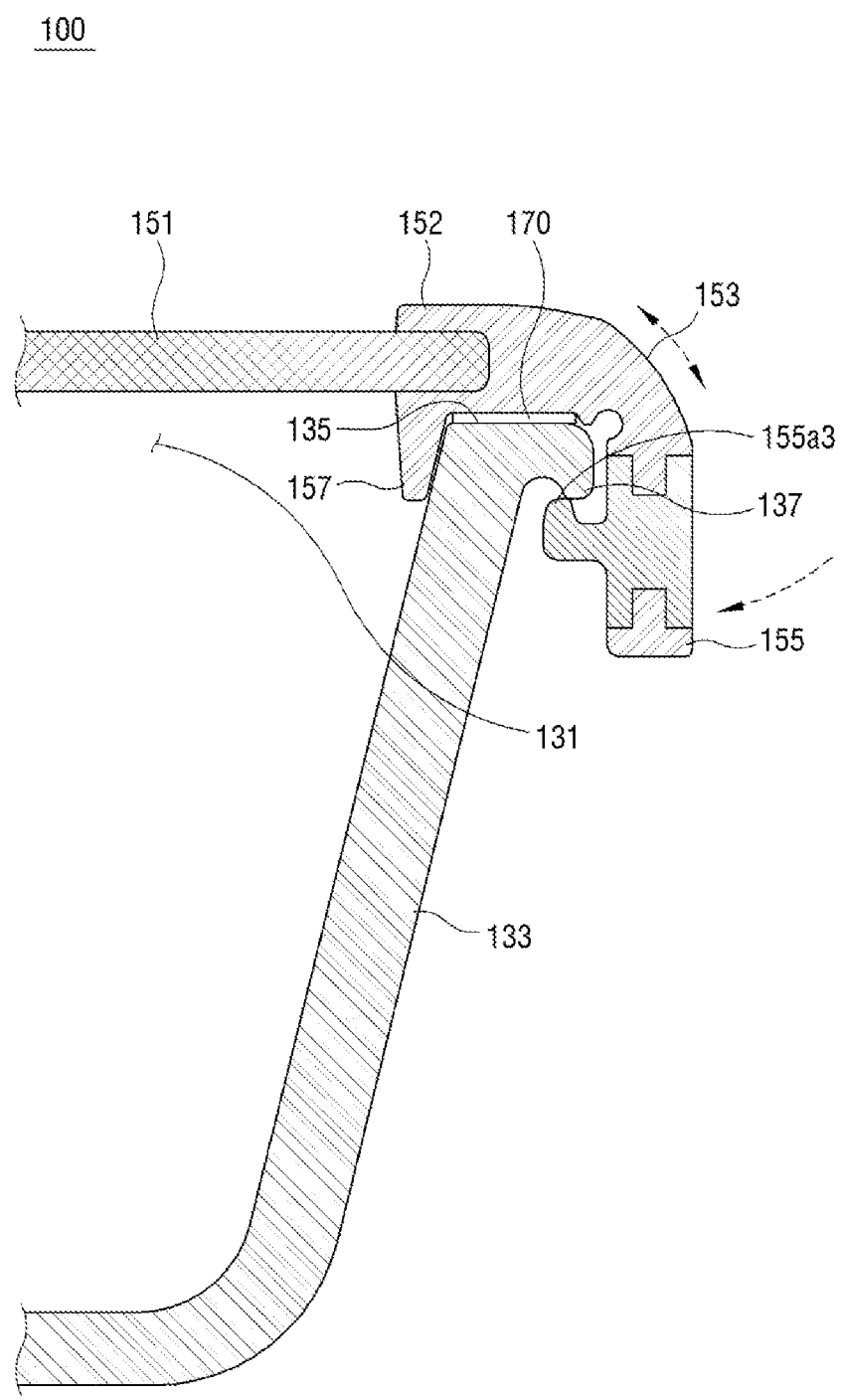
Figure 3C:
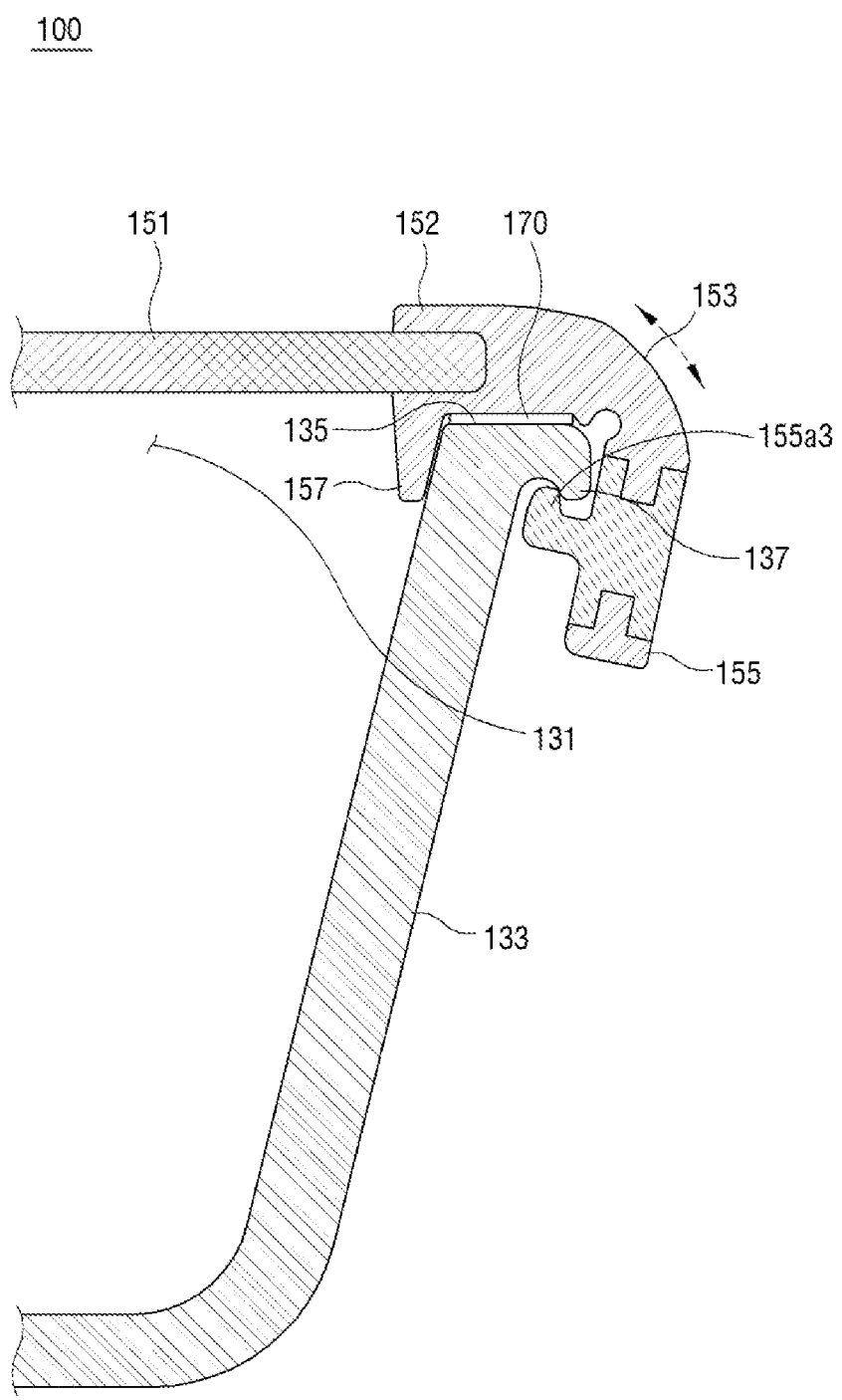
Figure 4:
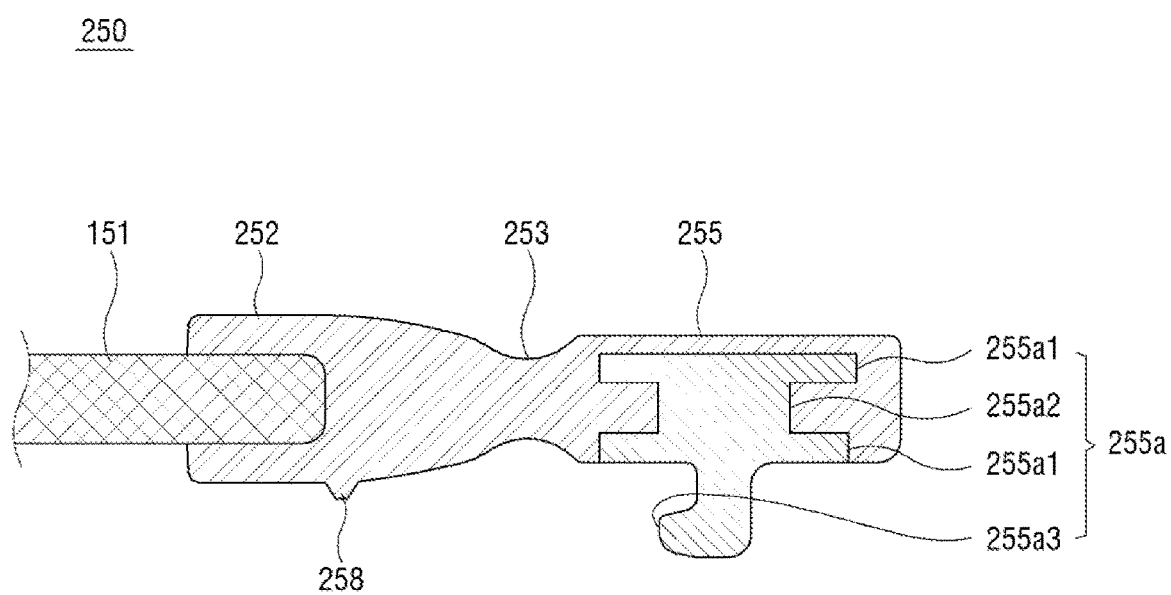
FIG. 4 is a cross-sectional view of a cover according to another embodiment of the disclosure.
Figure 5A:
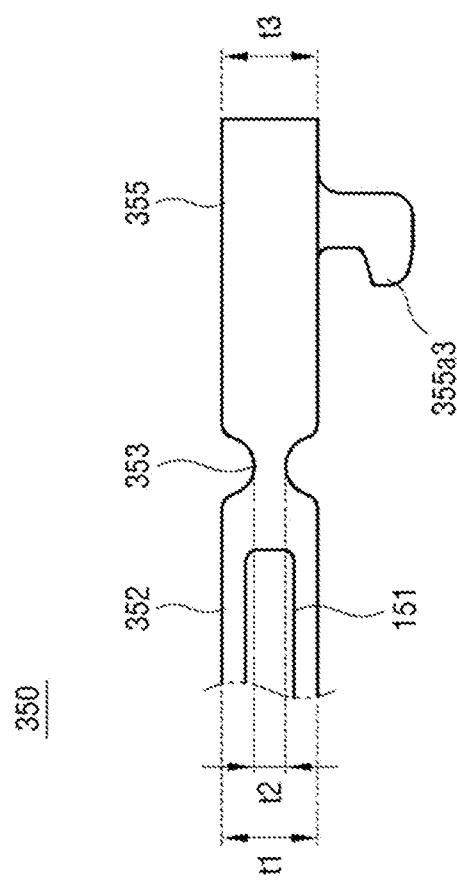
FIGS. 5A and 5B are cross-sectional views of a hinge according to still another embodiment of the disclosure.
Figure 5B:
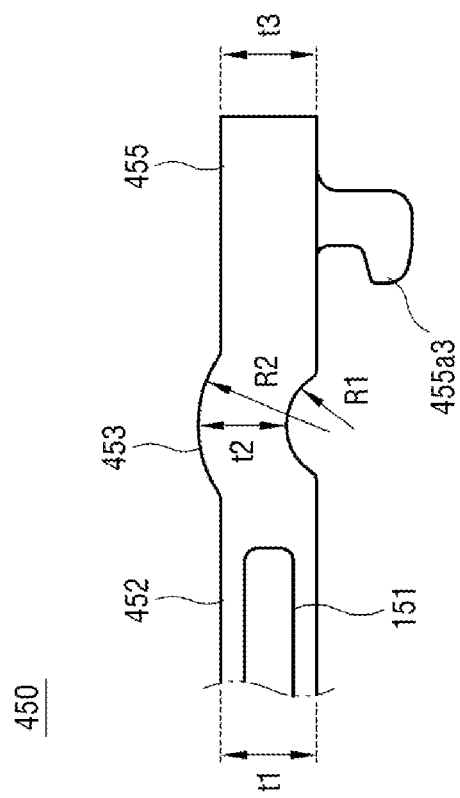

FIG. 1 is a perspective view and a partial enlarged view of an airtight container according to an embodiment of the disclosure, FIG. 2 is a perspective view and a cross-sectional view of a cover in FIG. 1 viewed from below, FIGS. 3A to 3C are partial cross-sectional views for describing operations of the airtight container, FIG. 4 is a cross-sectional view of a cover according to another embodiment of the disclosure, and FIGS. 5A and 5B are cross-sectional views of a hinge according to still another embodiment of the disclosure.

The airtight container 100 according to the disclosure may include a container main body 130 having an opening 131 opened upward; a cover 150 for covering and opening the opening 131; an edge portion 152 coupled to the edge of the cover 150 so as to press a sealing edge 135 formed at an upper end of the container main body 130; a locking clamp 155 extended from the edge portion 152 and having an engaging portion 155 a to engage with an engaging-portion holder 137 extended from the sealing edge 135 or formed in a lateral wall 133 so that the container main body 130 and the cover 150 can be airtightly coupled; and a hinge 153 provided between the edge portion 152 and the locking clamp 155 and made of a material to be folded and unfolded with respect to the edge portion 152 so that the engaging portion 155 a can be locked to and released from the engaging-portion holder 137.

The container main body 130 may include a bottom (not shown), the lateral wall 133 extended upward from the bottom, the sealing edge 135 bent and extended outward from the end of the lateral wall 133, and the engaging-portion holder 137 extended from the sealing edge 135.

The sealing edge 135 may have various shapes. In this embodiment, the sealing edge 135 is horizontally extended outward from the upper end portion of the lateral wall 133.

The engaging-portion holder 137 is gently bent downward from the end portion of the sealing edge 135, and formed along edge of the container main body 130 to engage with the engaging portion 155 a and maintain a locked state.

Unlike this embodiment, the engaging-portion holder 137 may have an alternative structure of protruding outward from the lateral wall 133 and coupling with the engaging portion 155a.

The container main body 130 in this embodiment is shaped like a square, a rectangle or the like quadrangle, but may alternatively be shaped like a circle.

The container main body 130 and a plate 151 of the cover 150 (to be described later) may for example made of glass to be used for a microwave at a high temperature. However, when it is not used at a high temperature or the like, the container main body 130 may include a hard non-synthetic resin (e.g., ceramics, porcelain, metal) and a hard synthetic resin.

The cover 150 is coupled to the container main body 130 with a packing 170 therebetween by the engaging-portion holder 137 and the engaging portion 155a and thus maintain airtightness so that the opening 131 can be sealed and content accommodated in the container main body 130 can be stably stored.

The cover 150 includes the plate 151 disposed in a middle region and sealing the opening 131, the edge portion 152 having a double injection-molding structure to partially surround the edge of the plate 151 up and down, and the hinge 153 extended outward from the edge portion 152 and provided to be folded and unfolded while pivoting around the edge portion 152 so that the engaging portion 155a of the locking clamp 155 can be locked to and released from the engaging-portion holder 137 of the container main body 130.

Here, the edge portion 152, the hinge 153 and the locking clamp 155 may be all made of a soft material, e.g., silicon rubber as they are connected as one. In other words, the edge portion 152, the hinge 153 and the locking clamp 155 may for example be formed in such a manner that the plate 151 is first made of glass and then the edge portion 152 of the plate 151 is double injection-molded with silicon rubber into a mold in which the plate 151 is disposed.

The edge portion 152 has a '⊏'-shaped structure to surround the outer edge region of the plate 151 up and down with the plate 151 inserted in the middle thereof. The edge portion 152 includes an inner edge guide 157 protruding at four lower inner-corner regions and guiding the cover 150 to be stably in position in the container main body 130 when the cover 150 approaches the upper inner end portion of the lateral wall 133 and is coupled to the container main body 130, and a packing-accommodating projection 158 protruding at a region corresponding to the outside of the sealing edge 135 and guiding the packing 170 to be stably in position.

According to an embodiment, the engaging portion 155 a includes an engaging plate 155a1 separated into two portions up and down, an engaging-plate coupling member 155a2 partially protruding from the plate of the engaging plate 155a1 to couple with the engaging plate 155a1, and an engaging projection 155a3 extended from the engaging plate 155a1 and locked to or released from the engaging-portion holder 137.

The engaging portion 155 a may be formed of a hard synthetic resin or the like on the contrary to the soft locking clamp 155, and coupled to the locking clamp 155 by thermal fusion or double injection-molding.

In this embodiment, the thermal fusion or the like may be used after two upper and lower engaging plates 155a1 are coupled to an engaging-plate accommodating member 155c recessed corresponding to the shape of the engaging plate 155a1 from the plate of the locking clamp 155, and the engaging-plate coupling member 155a2 protruding from one plate of the engaging plate 155a1 is coupled to an engaging hole 155b.

Of course, a cover 250 according to another embodiment may, as shown in FIG. 4, be double injection-molded into a locking clamp 255 in the state that an engaging plate 255a1, an engaging-plate coupling member 255a2, and an engaging projection 255a3 corresponding to those shown in FIGS. 1 and 2 are formed as one.

This embodiment may provide simpler work and more beautiful outer appearance than those of the foregoing embodiment.

The engaging projection 155a3 may protrude from the overall plate of the engaging plate 155a1, or may protrude forming a pair from the left and right ends of the plate.

As described above, the locking clamp 155 includes the engaging-plate accommodating member 155c recessed corresponding to the shape of the engaging plate 155a1 from the plate excluding the middle portion from the upper and lower plates, and the engaging hole 155b formed so that the engaging-plate coupling member 155a2 can pass through the center of the engaging-plate accommodating member 155c.

In this way, when the two upper and lower engaging plates 155a1 are coupled by the engaging-plate coupling member 155a2, the engaging portion 155 a is coupled to the locking clamp 155 by the thermal fusion or the like after the plate 151 of the cover 150 is first double injection-molded with the edge portion 152, the hinge 153 and the locking clamp 155.

With this structure, the hinge 153 of the cover 150 includes the soft silicon material to have elasticity and durability, and is thus prevented from damage even though it is repeatedly folded and unfolded for a long time. Further, the hinge 153 is kept flat when the cover 150 is entirely separated from the container main body 130.

The operations of the airtight container 100 with this structure according to the disclosure will be described below in detail with reference to FIGS. 3A to 3C.

First, as shown in FIG. 3A, the cover 150 is put on the opening 131 of the container main body 130 as the cover 150 is separated or ready. In this case, as shown in FIG. 2, the cover 150 can be stably in position in the container main body 130 by the inner edge guides 157 protruding from the four lower inner-corner regions of the cover 150. Further, the plate 151, the edge portion 152, the hinge 153, and the locking clamp 155 of the cover 150 are disposed on the same plane and overall kept flat.

Next, as shown in FIG. 3B, a user presses the locking clamp 155 to pivot toward the engaging-portion holder 137, so that the engaging projection 155a3 can become in contact with the engaging-portion holder 137 and at the same time the hinge 153 is bent and stretched a little by elasticity. In this process, the packing 170 being in contact with the sealing edge 135 is also pressurized in between the sealing edge 135 and the cover 150.

Then, a user further presses the locking clamp 155 to move to the position as shown in FIG. 3C, so that the engaging-portion holder 137 and the engaging projection 155a3 can completely engage with each other, thereby stably coupling the container main body 130 and the cover 150 and preventing the engaging projection 155a3 from being released or unlocked from the engaging-portion holder 137 as long as a set external force is not applied to the locking clamp 155.

When it is desired to release the locked state as necessary, a user holds and presses the outmost end portion of the locking clamp 155 toward the outside of the container main body 130, so that the engaging-portion holder 137 and the engaging projection 155a3 can be released from each other by the elasticity of the hinge 153 and the locking clamp 155 can be restored to the position shown in FIG. 3A by the restoring force of the hinge 153.

Another embodiment of the disclosure shown in FIG. 4 has partially been described above.

The cover 250 in this embodiment has a structure that a hard engaging-portion holder 255a is embedded into the soft locking clamp 255. Of course, the engaging projection 255a3 is structurally exposed to the outside of the locking clamp 255. Although it is not illustrated, an engaging portion 255a may be partially embedded in the locking clamp 255.

In this structure, there is an advantage that an edge portion 252, a hinge 253 and the locking clamp 255 are formed as a single body by double injection-molding between the plate 151 and the engaging portion 255a in the state that the plate 151 of the cover 250 and the engaging portion 255a are disposed in a mold before injecting silicon rubber or the like soft material into the mold.

Still another embodiment of the disclosure is illustrated in FIGS. 5A and 5B.

This embodiment shows that the hinges 353 and 453 are variable in thickness and shape.

As shown in FIG. 5A, the thickness of an edge portion 352, the thickness of a hinge 353, and the thickness of a locking clamp 355 in a cover 350 are 't1', 't2' and 't3', respectively. In this case, the edge portion 352 is the thickest, the locking clamp 355 is the next thickest, and the hinge 353 is thinner than the locking clamp 355 and thus narrow a little.

Next, as shown in FIG. 5B, the thickness of a hinge 453 and the thickness of a locking clamp 455 in a cover 450 are 't2' and 't3', respectively. The hinge 453 and the locking clamp 455 have the same thickness, and, instead, the hinge 453 has an upward convex shape. This shape is advantageous to improve durability because the hinge 453 is more effectively curved being thickly kept when an engaging portion 455a engages with the engaging-portion holder 137.

Further, the radius of upper curvature (see 'R2' in FIG. 5B) and the radius of lower curvature (see 'R1' in FIG. 5B) of the hinge 453 may be different. Because the upper side is more stretched than the lower side when the engaging portion 455a moves toward the engaging-portion holder 137, the radius of upper curvature may be greater than the radius of lower curvature (R2>R1).

With this structure, the engaging portion 155a more smoothly operates.

Thus, according to the disclosure, there is provided an airtight container with a soft hinge and a double injection-moulding structure, which is improved in durability because the hinge is prevented from damage even though it is used for a long time.

Further, there is provided an airtight container with a soft hinge and a double injection-moulding structure, which has a simple structure based on a double injection-molding structure between an edge portion and an engaging-portion holder, is readily cleaned with ease of use, is smoothly locked and unlocked, and is improved in sanitariness.

Further, there is provided an airtight container with a soft hinge and a double injection-moulding structure, which has a beautiful outer appearance with various colors based on a double injection-molding structure.

Although a few exemplary embodiments of the disclosure have been shown and described, it will be appreciated by those skilled in the art that various changes and equivalent embodiments may be made in these exemplary embodiments without departing from the principles and spirit of the invention, the scope of which is defined in the appended claims and their equivalents.

REFERENCE NUMERALS

| | |
|---|---|
| 100: airtight container | 130: container main body |
| 131: opening | 133: lateral wall |
| 135: sealing edge | |
| 137: engaging-portion holder | |
| 150: cover | 151: plate |
| 152: edge portion | 153: hinge |
| 155: locking clamp | 155a: engaging portion |
| 155a1: engaging plate | |
| 155a2: engaging-plate coupling member | |
| 155a3: engaging projection | 155b: engaging groove |
| 155c: engaging-plate accommodating member | |
| 157: inner edge guide | |
| 158: packing-accommodating projection | |
| 170: packing | |

What is claimed is:

1. An airtight container comprising a container main body with an opening opened upward, and a cover for covering and opening the opening, the airtight container comprising:
   an edge portion coupled to an edge of the cover to press a sealing edge formed at an upper end of the container main body;
   a locking clamp extended from the edge portion and comprising an engaging portion to engage with an engaging-portion holder extended from the sealing edge or formed in a lateral wall so that the container main body and the cover can be airtightly coupled; and
   a hinge provided between the edge portion and the locking clamp and comprising a material to be folded and unfolded with respect to the edge portion so that the engaging portion can be locked to and released from the engaging-portion holder,
   wherein the hinge is entirely made of an elastically transformable material, and the locking clamp extended from the hinge is formed with the engaging portion comprising a hard synthetic resin,
   wherein the engaging portion includes an engaging plate which includes a first portion and a second portion, and the first portion and the second portion of the engaging plate are configured to be coupled with each other.

2. The airtight container according to claim 1, wherein the hinge comprises silicon rubber.

3. The airtight container according to claim 1, wherein the edge portion and the locking clamp comprise silicon rubber.

4. The airtight container according to claim 1, wherein the engaging portion couples with the locking clamp by double injection-molding or thermal fusion.

5. The airtight container according to claim 1, wherein the hinge is thinner than the locking clamp.

6. The airtight container according to claim 1, wherein the hinge has the same thickness as the locking clamp and protrudes upward.

7. The airtight container according to claim 1, wherein the edge portion, the hinge and the locking clamp, which are coupled to the cover, become parallel to a plate of the cover when released from the container main body.

8. The airtight container according to claim 2, wherein the edge portion and the locking clamp comprise silicon rubber.

* * * * *